United States Patent [19]
Chou

[11] Patent Number: 5,881,783
[45] Date of Patent: Mar. 16, 1999

[54] FILLER NOZZLE

[76] Inventor: Wen San Chou, P.O. Box 82-144, Taipei, Taiwan

[21] Appl. No.: 998,976

[22] Filed: Dec. 29, 1997

[51] Int. Cl.⁶ .................................................. B65D 30/24
[52] U.S. Cl. .......................... 141/351; 141/313; 141/352; 141/383; 441/41; 251/149.6; 383/66
[58] Field of Search .............................. 141/10, 313, 383, 141/351–355; 222/566, 572; 441/41; 383/66; 251/149.6

[56] References Cited

U.S. PATENT DOCUMENTS

| | | | |
|---|---|---|---|
| 4,102,364 | 7/1978 | Leslie et al. | 141/10 |
| 4,927,397 | 5/1990 | Yeager | 441/41 |
| 5,255,713 | 10/1993 | Scholle et al. | 251/149.6 |
| 5,271,111 | 12/1993 | Johenning | 141/352 |
| 5,433,242 | 7/1995 | Buchtel et al. | 251/149.6 |
| 5,445,186 | 8/1995 | Richter et al. | 251/149.6 |
| 5,651,403 | 7/1997 | Andresen | 141/383 |
| 5,697,410 | 12/1997 | Rutter et al. | 141/352 |

*Primary Examiner*—J. Casimer Jacyna
*Attorney, Agent, or Firm*—A & J

[57] ABSTRACT

A filler nozzle includes a nozzle body, a connecting ring, an intake nozzle, a securing seat, a securing ring, a valve flap, a positioning element, and a spring. One end of the nozzle body has a connector for connection with the connecting ring and the intake nozzle. The intake nozzle is linked to a snap ring of the connecting ring. The outer end of the connector is provided with two opposed insert pieces for engaging insert seats on the outer periphery of the intake nozzle. The other end of the nozzle body forms an insert connector for receiving the securing seat. The securing seat has a shaft fitted with the spring, the positioning element, the valve flap and the securing ring. By means of the cooperation between the positioning element and the securing seat, the valve flap can be caused to open or close for inflation or deflation.

1 Claim, 6 Drawing Sheets

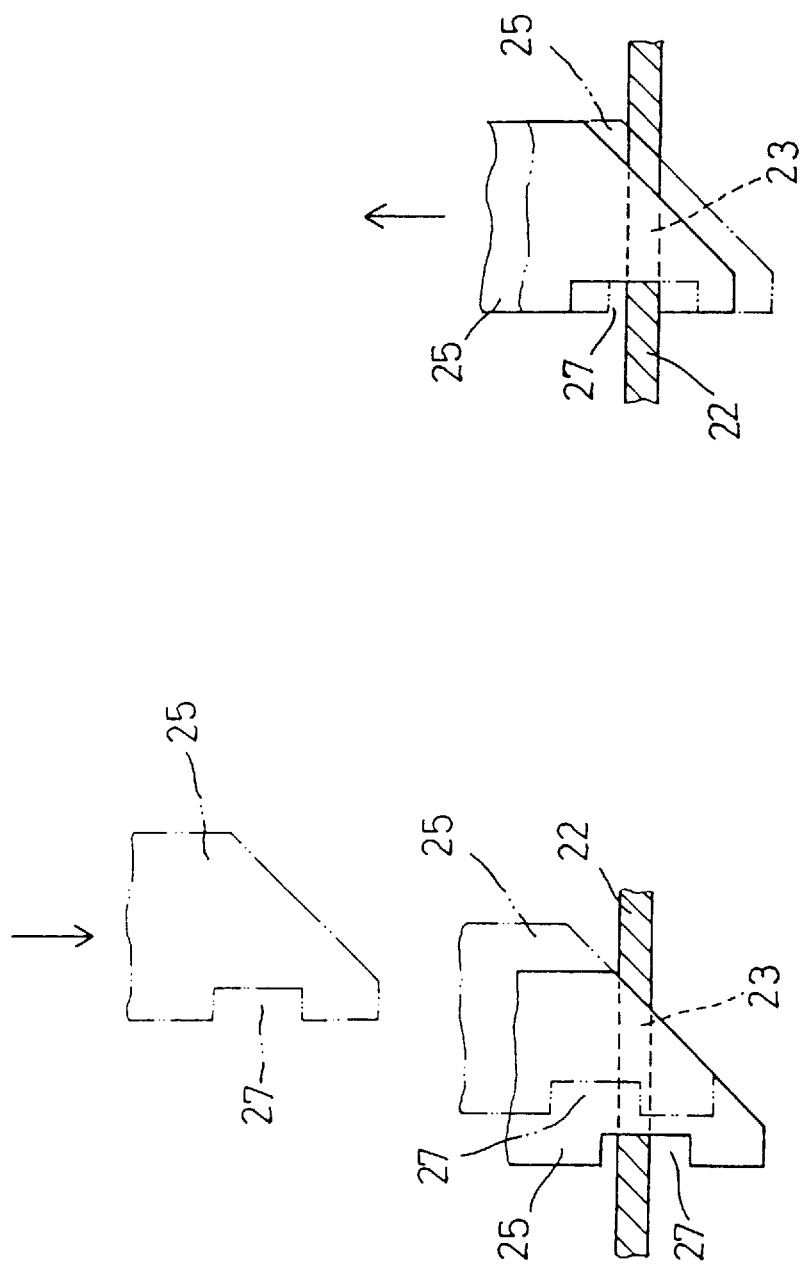

FILLER NOZZLE

BACKGROUND OF THE INVENTION

1. Field of the Invention

The present invention relates generally to a filler nozzle, and more particularly to a filler nozzle in which the valve flap can be controlled to open or close for inflation or deflation purposes.

2. Description of the Prior Art

Inflatable boats or rafts are very common. They are equipped with filler nozzles for inflation purposes. However, conventional filler nozzles may easily be opened when hit by external objects. It is therefore desirable to have a filler nozzle that cannot be easily opened when in contact with external objects.

SUMMARY OF THE INVENTION

The present invention relates generally to a filler nozzle, and more particularly to a filler nozzle in which the valve flap can be controlled to open or close for inflation or deflation purposes.

A primary object of the present invention is to provide a filler nozzle which is equipped with a valve flap that can be controlled to open or close for inflation or deflation purposes and which will not be easily opened upon contact with external objects.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 6 is a further schematic view illustrating operation of the present invention;

Fig 7 is still another schematic view illustrating operation of the present invention.

DETAILED DESCRIPTION OF THE PREFERRED EMBODIMENT

Figure 1:
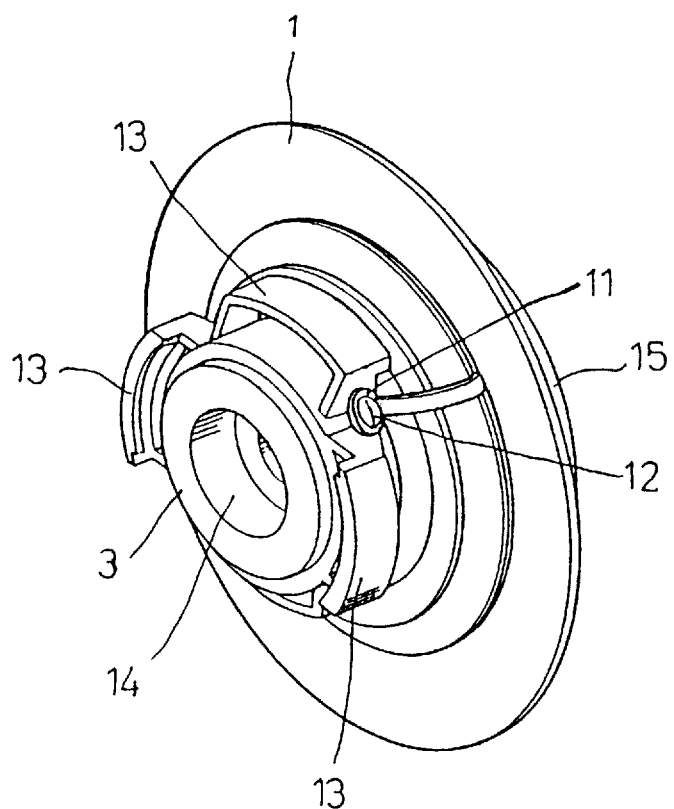
FIG. 1 is a perspective assembled view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
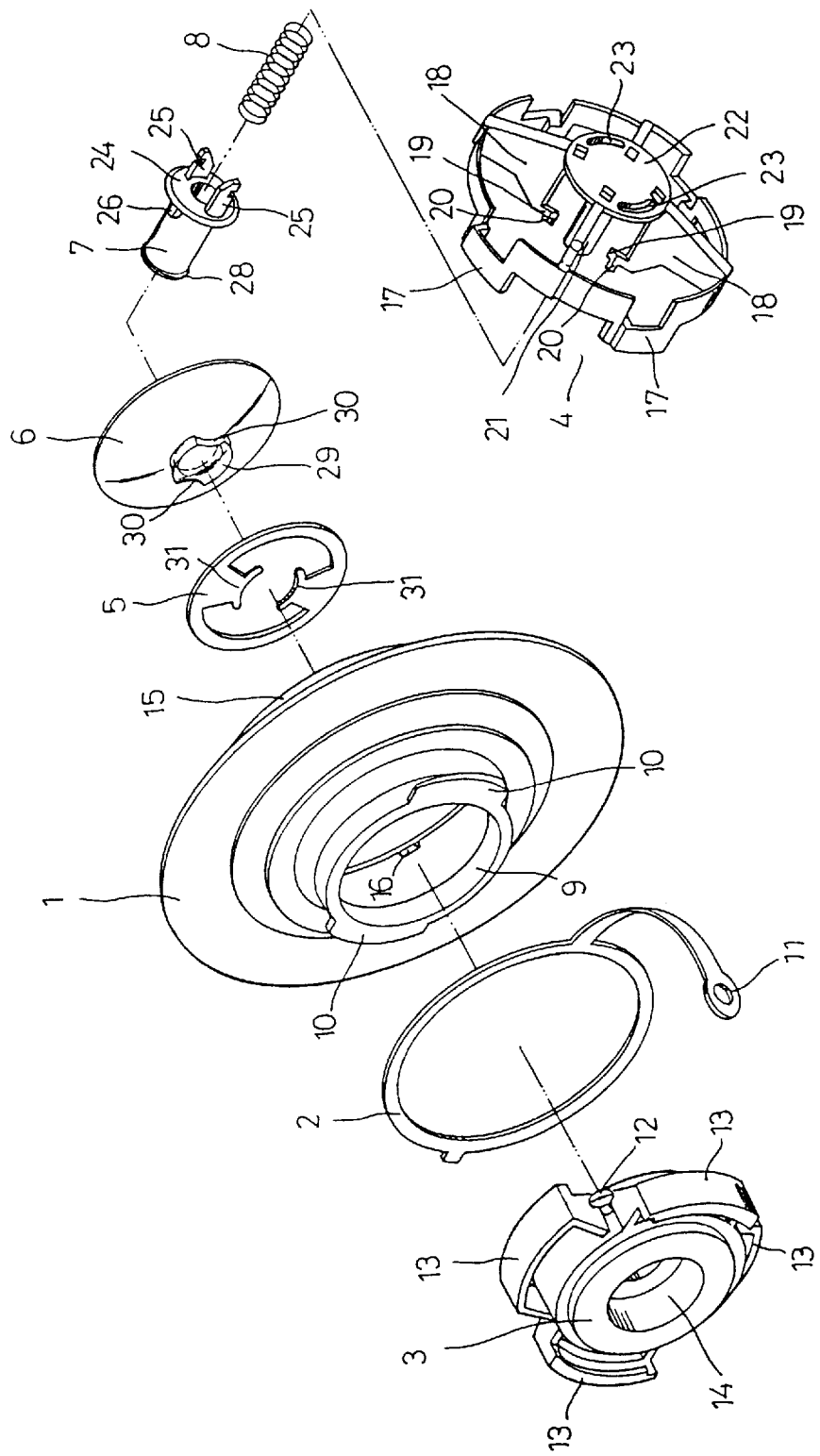
FIG. 2 is a perspective exploded view of the present invention.

With reference to FIG. 2, the filler nozzle of the present invention comprises a nozzle body 1, a connecting ring 2, an intake nozzle 3, a positioning seat 4, a securing ring 5, a valve flap 6, a positioning element 7 and a spring 8.

One end of the nozzle body 1 is provided with a connector 9 for receiving the connecting ring 2 and the intake nozzle 3. An outer end of the connector 9 is provided with opposite insert portions 10 projecting from both sides thereof. The connecting ring 2 is fitted over the connector 9 and has an extended portion with a snap ring 11 at a distal end, the snap ring 11 engaging a nose 12 on the intake nozzle 3 (as shown in FIG. 1). The intake nozzle 3 includes two opposite insert seats 13 at both sides of an outer wall thereof, the insert seats 13 being oriented in different directions and capable of engaging the insert portions 10. The external diameter of the intake nozzle 3 matches the diameter of the connector 9, whereas its internal diameter is divided into two intake ports 14 of different diameters.

Figure 3:
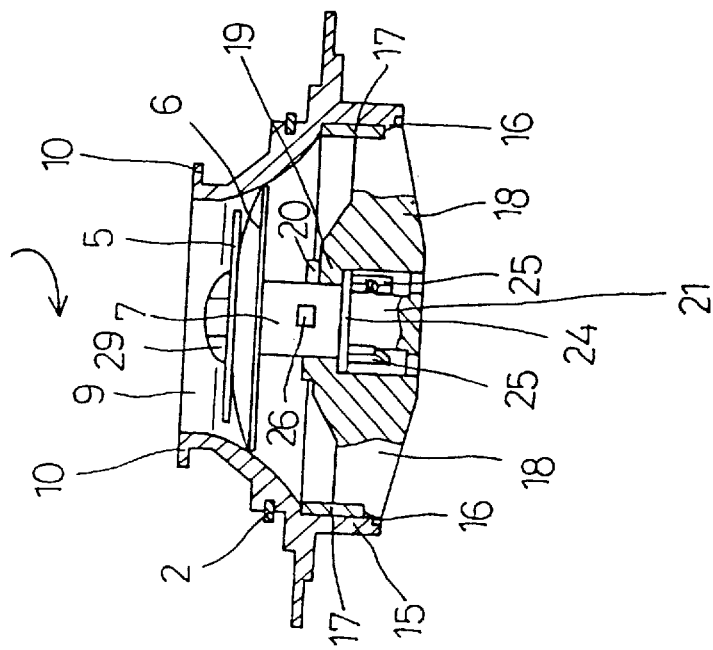
FIG. 3 is a sectional assembled view of the present invention.

The other end of the nozzle body 1 is provided with an insert connector 15 for receiving the securing seat 4. Referring to FIG. 3, the inner circumference of the insert connector 15 is provided with four retaining points 16 which are spaced equally apart from each other. The securing seat 4 resembles a ring. It has an external diameter slightly smaller than the external diameter of the insert connector 15 and an outer wall provided with four symmetrical spaced retaining portions 17, each of which is substantially L-shaped. The securing seat 4 utilizes these retaining portions 17 to engage the four retaining points 16 of the insert connector 15, as shown in FIG. 3. The securing seat 4 further has four insert seats 18 all connected to a base disk 22 at the center. An upper end of each insert seat 18 extends in the direction of the center to form an insert piece 19 of a suitable length. The upper right end of the insert piece 19 is provided with a projecting stop portion 20. The base disk 22 is provided with two opposite curved through holes 23, the right side of each curved through hole 23 being cut slantingly (see FIG. 6). The center of the securing seat 4 is further provided with a shaft 21 fitted with the spring 8 and the positioning element 7.

The positioning element 7 is substantially cylindrical and has a raised rim 28 at the top end and a stop plate 24 of a larger diameter at the bottom end. A pair of substantially curved hook pieces 25 is disposed at the bottom side of the stop plate 24. With reference to FIG. 6, the lower right portion of each hook piece 25 is obliquely cut to form a slanting surface which can match the slanting right side of the curved through hole 23, whereas the lower left side of the hook piece 25 is provided with a notch 27. The positioning element 7 is further provided with a projection 26 at its cylindrical body.

When the positioning element 7 is fitted into the shaft 21, the stop portion 24 will be located below the insert pieces 19 of the insert seats 18 and be restricted. The projection 26 on the positioning element 7 will rest on the insert pieces 19 and be checked by the stop portions 20 at the upper side of the insert pieces 19 so that it can only move between the two insert seats 18 (i.e., within an angle of 90 degrees).

Additionally, the spring 8 provides a source of elasticity for the positioning element 7. The central portion of the valve flap 6 is provided with a projecting seat 29 which is provided with two facing recesses 30. The valve flap 6 is disposed above the positioning element 7, secured by the securing ring 5. The securing ring 5 has two opposed clamp portions 31 which clamp the projecting seat 29 on the valve flap 6.

In use, referring to FIGS. 3–7, the positioning element 7 is urged by the action of the spring 8 to push upwardly, so that the valve flap 6 is caused to urge against the inside of the nozzle body 1 to thereby close the nozzle body 1 (see FIG. 3). At the same time, since the projection 26 on the positioning element 7 is located above the insert pieces 19 and cannot press downwardly, it can prevent contact with external objects which may cause air leakage.

Figure 4:
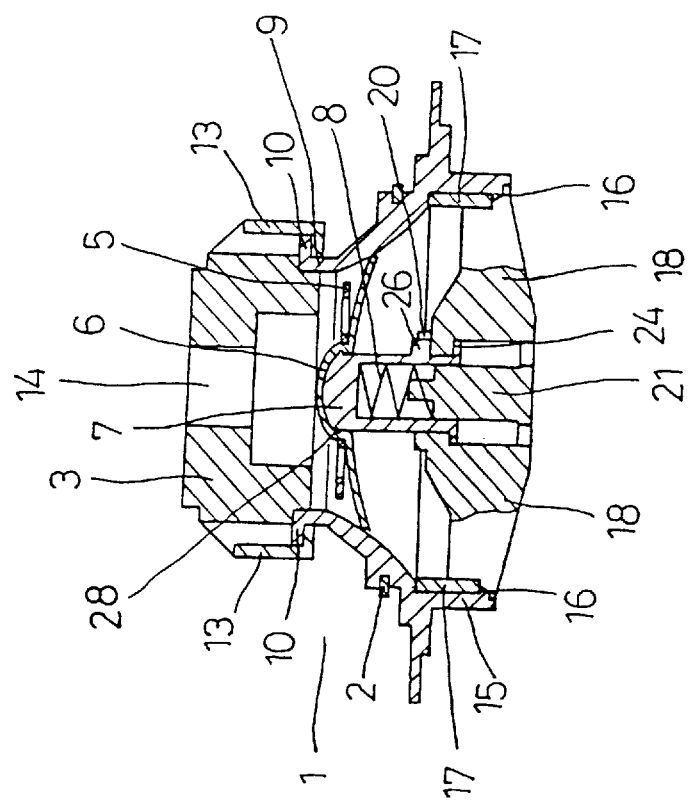
FIG. 4 is a schematic view illustrating operation of the present invention.
Figure 5:
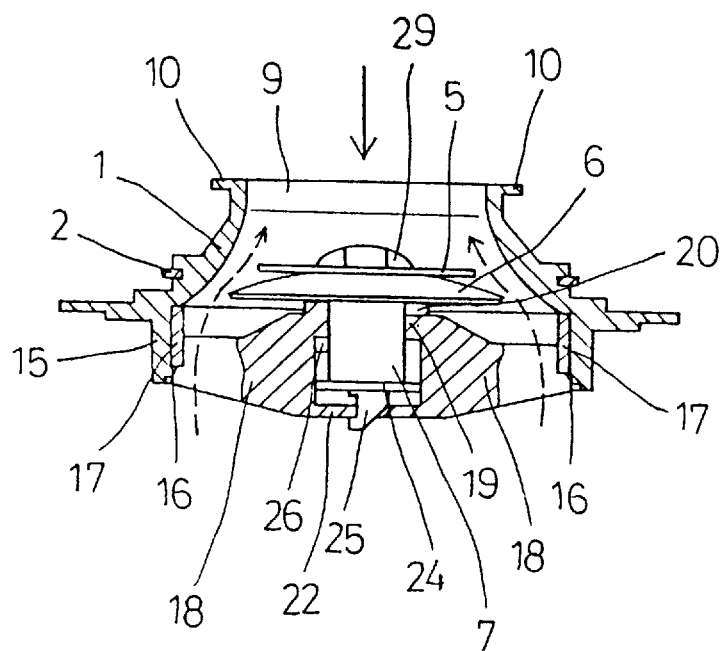
FIG. 5 is another schematic view illustrating operation of the present invention.
Figure 8:
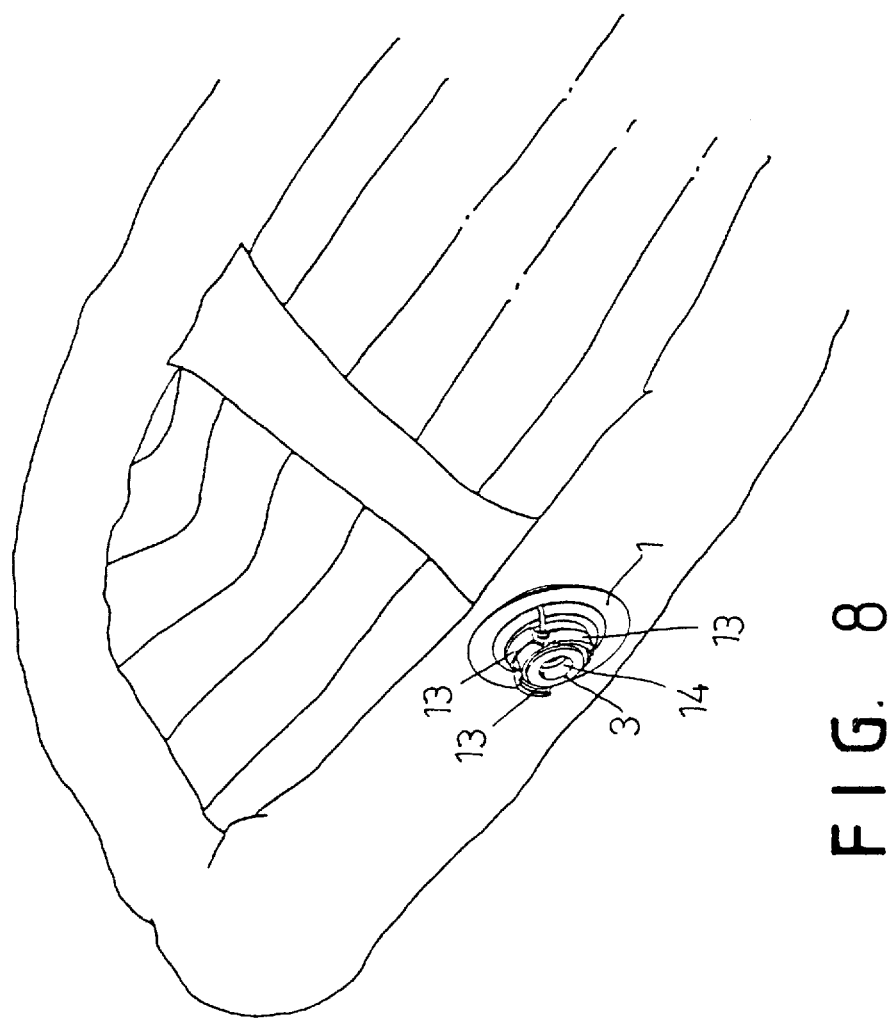
FIG. 8 is a schematic view of the present invention used in an inflatable boat.

To inflate or deflate, the valve flap 6 is turned about an angle in a clockwise direction so that the projection 26 of the positioning element 7 disengages from the restriction of the insert pieces 19 (see FIG. 4). The valve flap 6 is then pressed downwardly. At the same time, the hook pieces 25 at the lower portion of the positioning element 7 are caused to slidably displace to the left due to the restriction of the curved through holes 23 so that the notches 27 at the lower left side of the hook pieces 25 rest at the left side of the through holes 23 (see FIG. 6). When the force applied is lifted, the positioning element 7 will urge upwardly due to the elasticity of the spring 8 so that the notches 27 of the hook pieces 27 hold the left side of the through holes 23 and be positioned (see FIG. 7). At this point, the valve flap 6 drops so that the nozzle body 1 is in an open state, allowing air inflation or deflation. After completion, the valve flap 6 is turned in a counterclockwise direction so that the notches 27 of the hook pieces 25 are caused to displace to the right to disengage from the restriction of the left side of the through holes 23 and the positioning element 7 pushes upwardly due to the elasticity of the spring 8, causing the valve flap 6 to close the nozzle body 1 (see FIG. 3).

Furthermore, the insert seats 13 of the intake nozzle 3 may secure with the insert portions 10 of the connector 9 of the nozzle body 1, as shown in FIG. 3, to connect to an inflation nozzle of an air pump. In addition, since the intake nozzle 3 is provided with two intake ports 14 of different diameters, it can match the size the the inflation nozzle of the air pump.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A filler nozzle, comprising:
    a nozzle body, one end thereof being provided with a connector, said connector having an outer end provided with opposite insert portions projecting from both sides thereof, the other end of said nozzle body being provided with an insert connector having an inner circumference provided with four retaining points which are spaced equally apart from each other;

a connecting ring, being fitted over said connector of said nozzle body and having an extended portion with a snap ring at a distal end thereof;

an intake nozzle, connected to said connector of said nozzle body; and a securing seat, being received in said insert connector of said nozzle body and resembling a ring, said securing seat having an external diameter slightly smaller than the external diameter of said insert connector and an outer wall provided with four symmetrical spaced retaining portions each of which is substantially L-shaped, said securing seat being coupled to said insert connector by means of said retaining portions engaging said retaining points 16 of said insert connector;

a securing ring, having two opposed clamp portions;

a positioning element;

a valve flap, a central portion thereof being provided with a projecting seat which has two facing recesses, said valve flap being disposed above said positioning element and secured by said securing ring, said projecting seat being held by said clamp portions of said securing ring; and a spring, providing a source of elasticity for said positioning element, wherein said intake nozzle includes two opposite insert seats at both sides of an outer wall thereof, said insert seats being oriented in different directions and capable of engaging said insert portions, the external diameter of said intake nozzle matching the diameter of said connector whereas the internal diameter thereof is divided to form two intake ports of different diameters;

said securing seat further has four insert seats all connected to a base disk at the center, an upper end of each insert seat extending in the direction of the center to form an insert piece of a suitable length, an upper right end of said insert piece being provided with a projecting stop portion, said base disk being provided with two opposite curved through holes, a right side of each curved through hole being cut slantingly to form an angle, the center of said securing seat being further provided with a shaft fitted with said spring and said positioning element; and said positioning element is substantially cylindrical and has a raised rim at a top end thereof and a stop plate of a larger diameter at a bottom end thereof, said positioning element further having a pair of substantially curved hook pieces disposed at a bottom side of said stop plate, a lower right portion of each hook piece being obliquely cut to form a slanting surface which can match the slanting right side of said curved through hole whereas the lower left side of said hook piece is provided with a notch, said positioning element being further provided with a projection;

whereby when said positioning element is fitted into said shaft, said stop portion will be located below said insert pieces of said insert seats and be restricted while said projection on said positioning element will rest on the insert pieces and be checked by said stop portions at the upper side of said insert pieces so that it can only move between said two insert seats, said positioning element being urged by the action of said spring to push upwardly so that said valve flap is caused to urge against the inside of said nozzle body to thereby close said nozzle body while said projection on said positioning element is located above said insert pieces and cannot press downwardly, preventing contact with external objects which may cause air leakage.

* * * * *